A. S. FALLS.
DESK.
APPLICATION FILED AUG. 30, 1918.

1,334,949.

Patented Mar. 30, 1920.
8 SHEETS—SHEET 2.

A. S. FALLS.
DESK.
APPLICATION FILED AUG. 30, 1918.

1,334,949. Patented Mar. 30, 1920.
8 SHEETS—SHEET 5.

A. S. FALLS.
DESK.
APPLICATION FILED AUG. 30, 1918.

1,334,949.

Patented Mar. 30, 1920.
8 SHEETS—SHEET 6.

Witnesses:
W. F. Kilroy
Harry R. L. White

Inventor:
Alexander S. Falls
By Barnett Numan
Attys.

UNITED STATES PATENT OFFICE.

ALEXANDER S. FALLS, OF GLENCOE, ILLINOIS.

DESK.

1,334,949.   Specification of Letters Patent.   Patented Mar. 30, 1920.

Application filed August 30, 1918. Serial No. 252,046.

*To all whom it may concern:*

Be it known that I, ALEXANDER S. FALLS, a citizen of the United States, residing at Glencoe, in the county of Cook and State of Illinois, have invented certain new and useful Improvements in Desks, of which the following is a specification.

My invention relates to a combination desk which is suitable for use in connection with clerical work requiring the use of a typewriting machine, such for example, as a machine for making typewritten entries on ledger sheets, and also provides a suitable flat surface of considerable area which may be employed for bookkeeping, or the like, when the typewriting machine is not in use.

One of the objects of the invention is to provide a desk of the above character embodying certain recognized principles of sanitary construction, which will be strong, durable and compact in structure, so as to require a relatively small floor space, and which may be readily disassembled for the purpose of shipment.

A more specific object of the invention is to provide a desk of the above character having suitable constructions and arrangements which will permit a typewriting machine to be readily moved into or out of operative position, and also provide suitable surfaces for supporting the ledger sheets, or data to be used in connection with the typewriting machine, within convenient reach of the operator. In this connection the invention also contemplates a folding cover and novel devices for supporting it in its open or folded position and in addition certain novel devices for rigidly supporting the cover when it is closed to provide a combined cover and desk top which preferably inclines downwardly toward the front of the desk.

The invention consists of the novel arrangements, constructions and combination of devices hereinafter described and claimed for carrying out the above stated objects, and such other incidental objects as will appear from the following description.

The invention is illustrated in certain preferred embodiments in the accompanying drawings, wherein.

Like characters of reference designate like parts in the several figures of the drawings.

Figure 1:
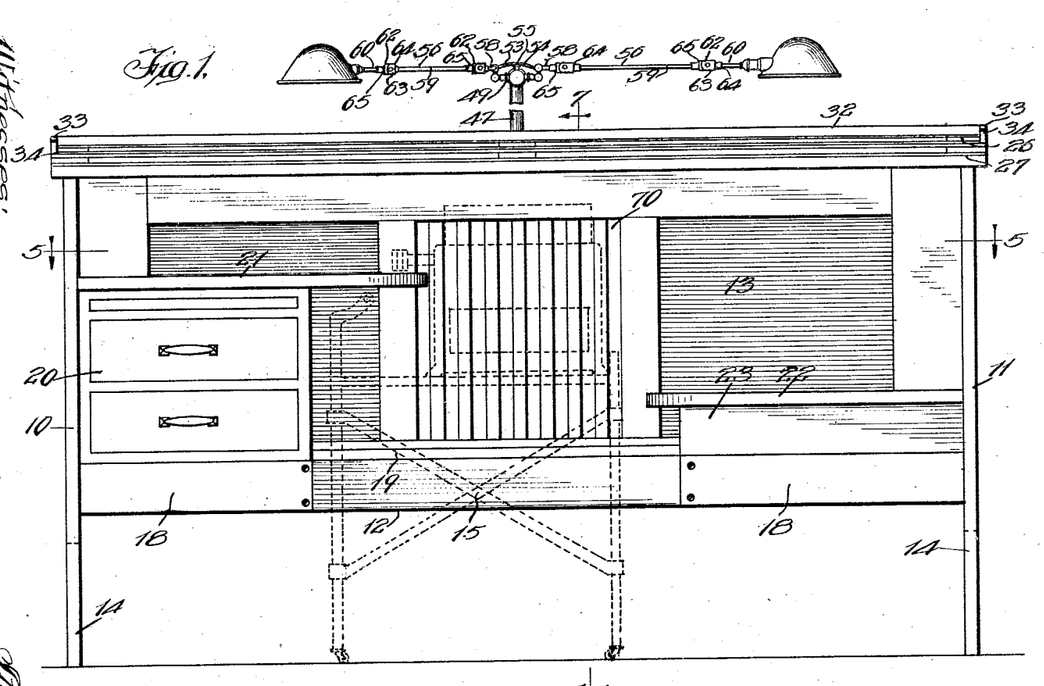
Figure 1 is a front view, in elevation, of a combination typewriter and bookkeeping desk, constructed in accordance with my invention.
Figure 2:
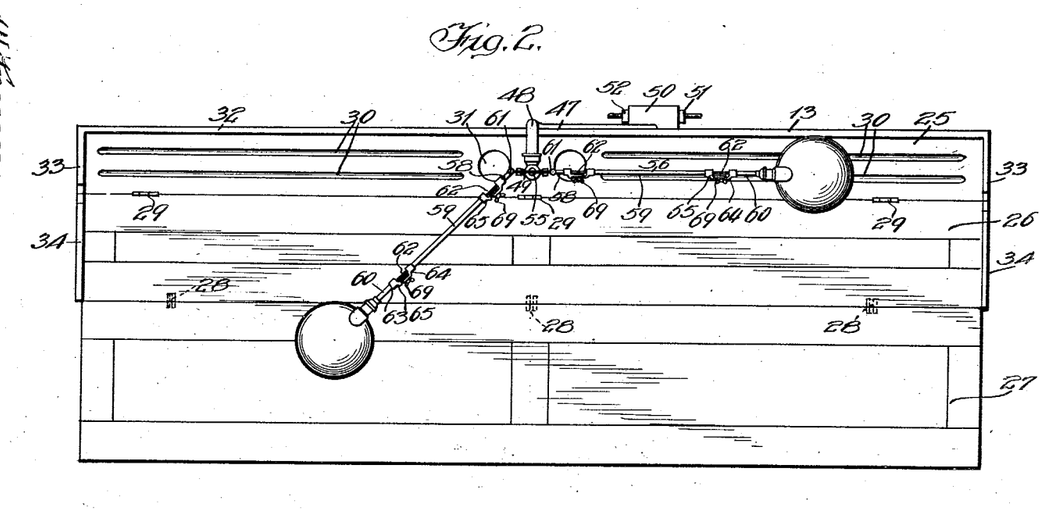
Fig. 2 is a plan view of the structure shown in Fig. 1.
Figure 3:
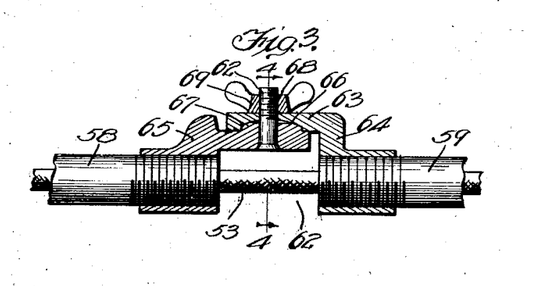
Fig. 3 is a longitudinal sectional view, taken through one of the flexible joints of the lamp-supporting bracket shown in Figs. 1 and 2.
Figure 4:
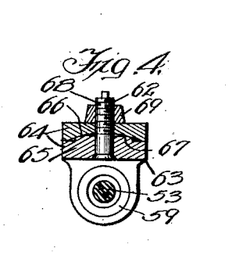
Fig. 4 is a cross-sectional view taken on line 4—4 of Fig. 3.

Referring first to Figs. 1 to 9 inclusive of the drawings, in which I have shown a desk comprising end panels 10, 11, which are connected together by means of a supporting and rigidifying frame 12 and a back 13. The lower edge of the end panels are preferably cut away to provide legs 14, and the frame 12 is supported above said cut-away portion. The rigidifying frame 12 preferably consists of bracing strips 15, 16, which extend from end to end of the desk and secured to the lower edge of the back 13 and to cross pieces 17 which are in turn secured to the end panels 10 and 11. Braces 18 extend diagonally from the front edge of the end panels to the bracing strips 15, and the space between the braces 15, 16 is preferably covered with a short strip 19. All of the elements of the rigidifying frame 12 and likewise the end and back panels of the desk are preferably screwed or otherwise detachably secured together, so that the desk may be disassembled, if desired, for shipment. A drawer section 20 having a flat top member 21 is supported by the frame 12 at the left of the desk and a flat top member 22 is similarly supported on a riser 23 at the right-hand end of the desk. This top member preferably is arranged at a lower level than the top member 21, so as to provide a convenient shelf to support the ledger or a suitable rack for holding ledger leaves and the like. The typewriting machine and its supporting stand, shown in dotted lines in Fig. 1, is arranged in the space between the top members 21, 22; the top member 21 being preferably cut away, as indicated at 24 in Fig. 5, to provide sufficient space for the movement of the carriage or other parts of the typewriting machine. The portion of the frame 12 which extends across said space serves as a stop for the typewriting machine when it is put in place. The back and end panels of the desk extend above the flat top members 21, 22, and support a combined cover and desk top which is suitable for use in connection with bookkeeping or other clerical work. This cover and desk top preferably inclines downwardly toward the front of the desk and preferably consists of a rigid section 25 and two folding sections or leaves 26, 27, which are hinged together by means of flush hinges 28 and attached to the rigid section 25 by hinges 29. The rigid section of this cover may be formed with grooves 30 and cavities 31 for retaining writing pens and ink-wells, and is also provided with projecting strips 32, 33, which extend around the rear and side edges thereof. The folding leaf 26 is also provided at opposite edges with projecting strips 34, 34.

When the typewriting machine is used, the folding leaf 27 is folded back upon the leaf 26 between the projecting strips 34, 34. Both folding leaves are then raised to the position indicated in dotted lines in Fig. 7 and supported in such position by means of automatic catch mechanism arranged at opposite ends of the desk. This catch mechanism is designated generally at 35 and consists in each case of an angular member 36 secured to the end panel 10 or 11 as the case may be, and provided at its upper edge with a flange 37. One side of the angular member is formed with a circuitous slot 38 which receives a stud on the lower end of a pivoted arm 39 when the cover is raised.

Figures 8, 9, 10:
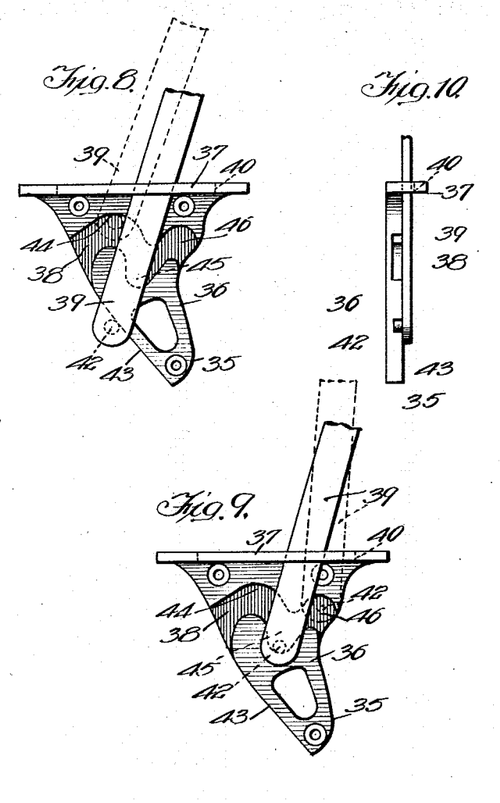
Figs. 8 and 9 are side views illustrating the construction and operation of the device for supporting the desk cover in its folded position.
Fig. 10 is an edge view of the device shown in Fig. 8.

The arm 39 extends through a slot 40 in the flange 37 of the angular member and is pivoted at its upper end to a bifurcated lug 41 secured to the underside of the folding panel 26. The lower end of the pivoted arm 39 is provided with a stud 42 which, when the leaves 26, 27 are raised to the dotted line position of Fig. 7, slides on the edge 43 of the member 36 and enters the slot 38. The upward movement of the folding cover is limited by the stud 42 entering an upwardly curved pocket 44 in the slot 38. The cover 26, 27, is then lowered sufficient to permit the stud 42 to enter a downwardly curved pocket 45 (Fig. 9) in the said slot where it is held by the walls of said pocket against accidental displacement while the cover is in raised position. When it is desired to close the cover, the leaves 26, 27 are first raised slightly from the position shown in dotted lines. This movement causes the stud 42 of the pivoted arm 39 to pass out of the slot 38 through the pocket 46, as indicated in Fig. 9. The cover 26, 27 and pivoted arm 39 may then be lowered to the position shown in full lines in Fig. 7.

In connection with the desk shown herein, I also provide an electric light supporting attachment which has sufficient flexibility to permit the lights to be moved down close to the typewriting machine when the desk cover is raised or moved to any other position desired. The construction of the light attachment is such as to permit a wide range of movement without danger of injuring the electric wires at the points where the sections of the lamp supports are connected. The preferred form of support for the desk lights consists of a conduit 47 which is bent as indicated at 48, so as to extend over the top of the desk, and is provided with a T-shaped head 49. The lower end of the conduit 47 is connected with a box 50 which is preferably formed with sockets at opposite ends to receive electric light plugs 51, 52, of the usual construction. The electric wires 53, 54, leading from the connecting box 50 to the desk lights, pass out of the conduit 47 through an opening 55 in the head 49, and into small pipes which provide pivoted supporting arms 56, 56, for the desk lights 57, 57. Each of these arms consists, preferably, of three hollow sections 58, 59 and 60, which are secured together and pivoted to the head 49, as indicated at 61, so as to swing horizontally above the desk. The adjacent ends of the sections 58, 59 and 60 are held in spaced relation, as indicated at 62, by means of flexible joint connections 63. These connections are formed by lugs 64, 65, on the adjacent ends of the arm sections; the said lugs being formed with co-engaged concave and convex surfaces 66, 67, which are clamped together with capacity for vertical movement by means of a screw 68 and thumb-nut 69. The wires 53, 54, extending across the spaces 62, are sufficiently loose to permit the arm sections to be turned at sharp angles to each other without danger of damaging the wires.

I do not claim herein the lighting fixture just described, as this device is made the subject of an application filed by me on February 1st, 1919, Serial No. 274,432 entitled "Bracket for supporting electric lights," which application is a division hereof.

The back 15 of the desk is formed with a slotted portion 70 which provides ventilation, and also prevents the noise of the typewriter from being resounded by the back panel of the desk.

Figure 5:
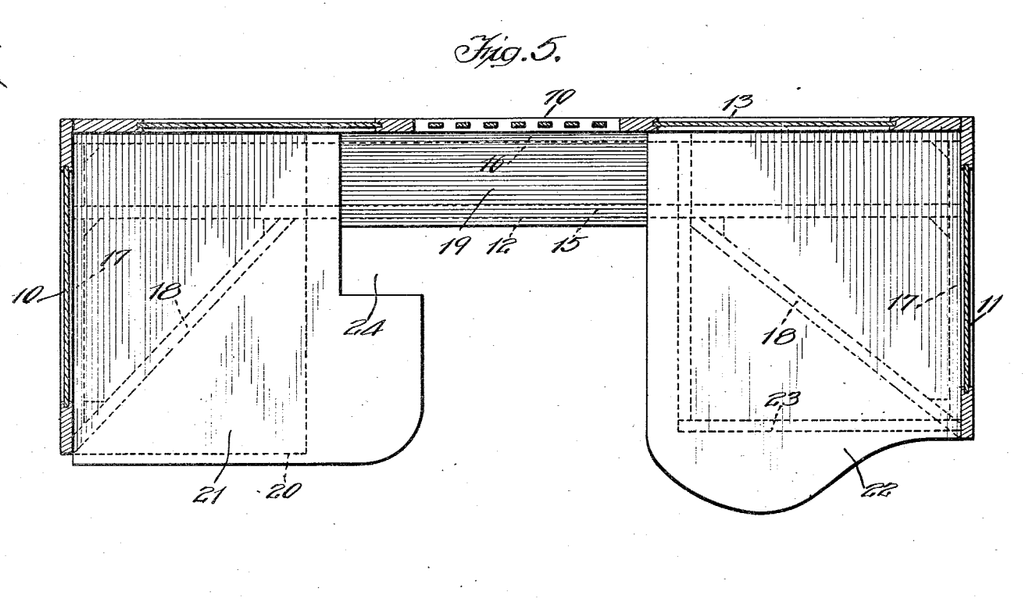
Fig. 5 is a sectional plan of the desk, the view being taken on line 5—5 of Fig. 1.
Figure 6:
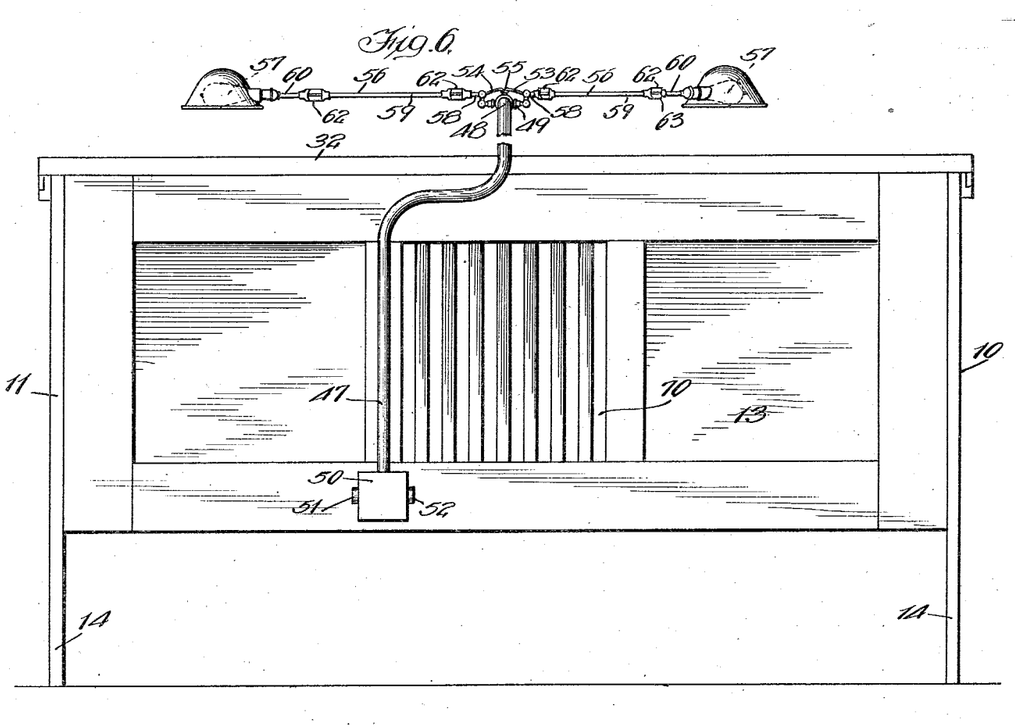
Fig. 6 is a view in elevation of the back of the desk.
Figure 7:
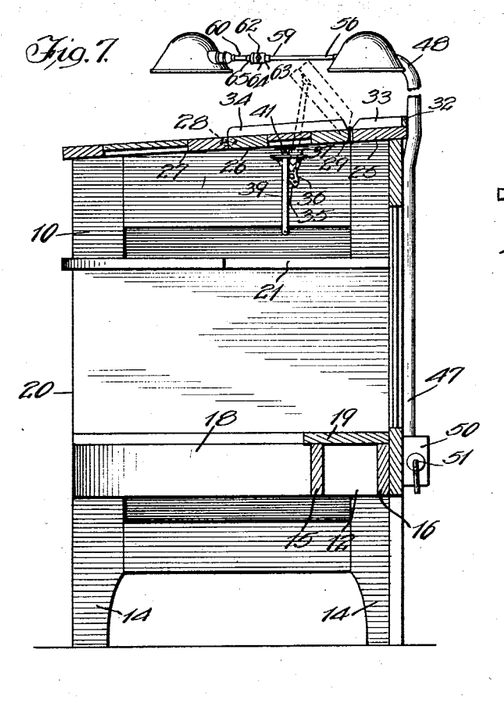
Fig. 7 is a cross-sectional view taken on line 7—7 of Fig. 1.
Figures 11, 12:
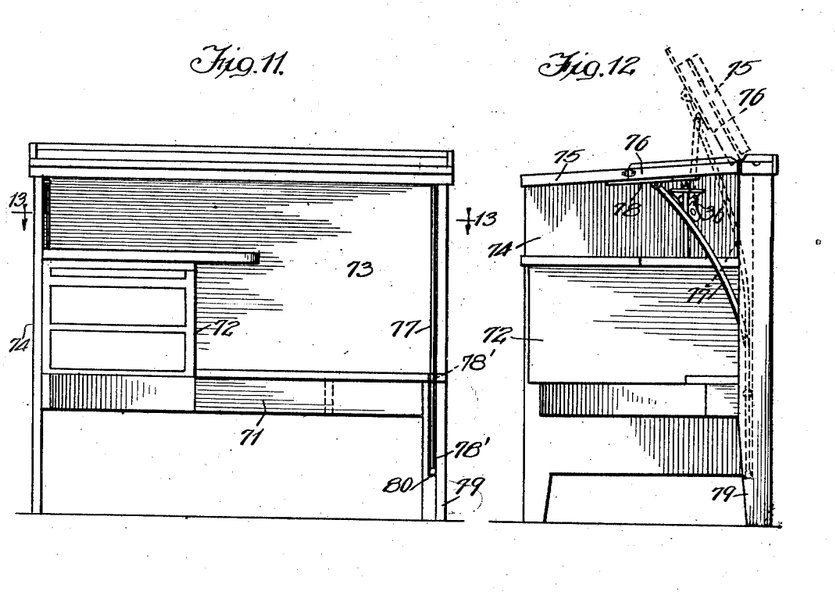
Fig. 11 is a front view, in elevation, of a modified form of desk.
Fig. 12 is an end view of the same.
Figure 13:
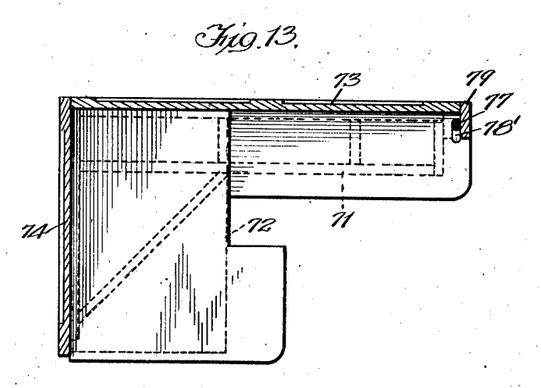
Fig. 13 is a plan section taken on line 13—13 of Fig. 11.

In Figs. 11 to 13 inclusive I have shown a desk similar to the one shown in Figs. 1 to 10 inclusive, though modified in certain respects, which makes it particularly suitable in situations where a flat desk portion, such as shown at 22 in Figs. 1 and 5, is not required. In this construction the desk consists of a frame 71 which supports a drawer section 72 at the left-hand end of the desk, a back member 73, one end panel 74, and a combined folding cover and desk top having hinged leaves 75, 76. The folding cover, when closed, is supported at the left end of the desk by the upper edge of the end panel 74, and at the right-hand end by a supporting arm 77 which is pivoted to a cleat 78 on the underside of the cover. The lower end of the arm 77 extends through a slot 78' in the leg 79 of the desk and rests on a shoulder 80. A portion of the cleat 78 preferably extends under the leaf 75 of the folding cover so as to rigidify this leaf when it is in the desk closing position. The folding cover may be supported in the open position by the automatic latch device 36, shown and described in connection with Figs. 1 to 10 inclusive.

Figure 14:
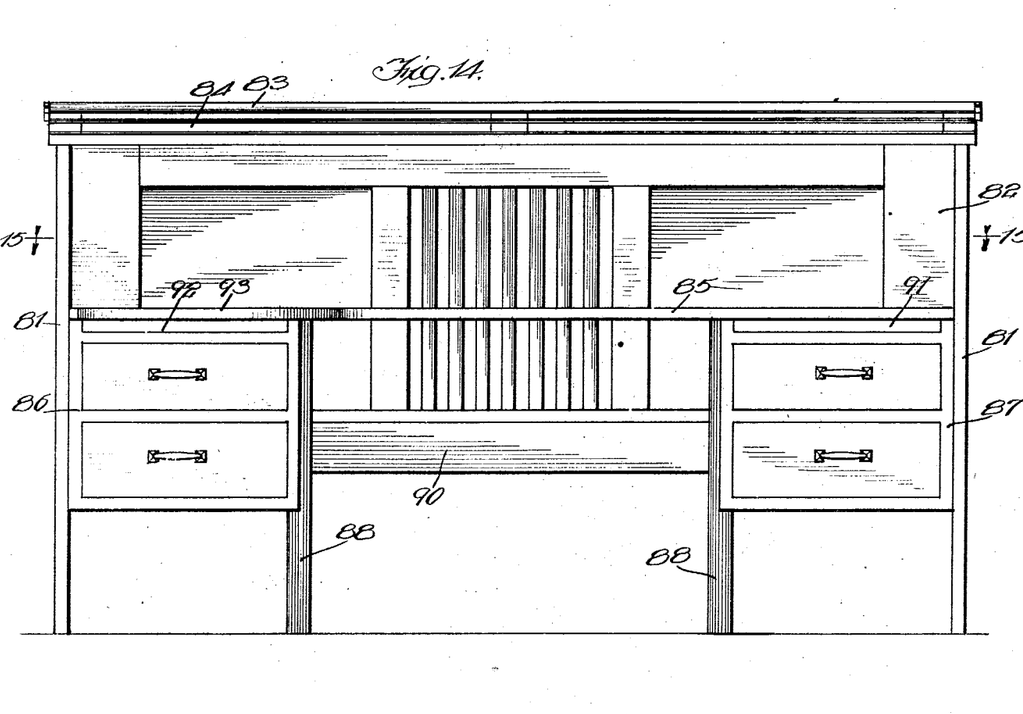
Fig. 14 is a front view in elevation of another form of desk.
Figure 15:
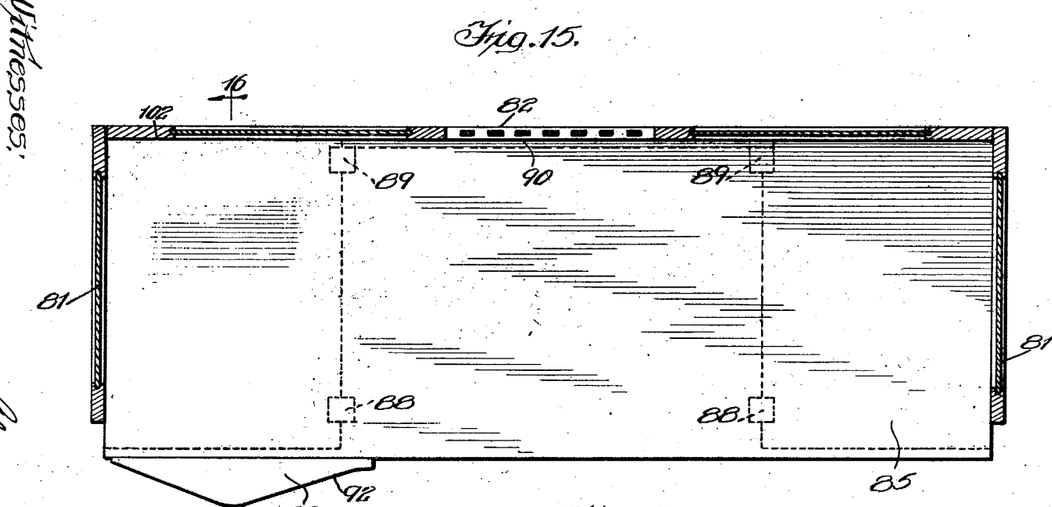
Fig. 15 is a sectional plan view of the desk shown in Fig. 14, the view being taken on line 15—15 thereof.
Figure 16:
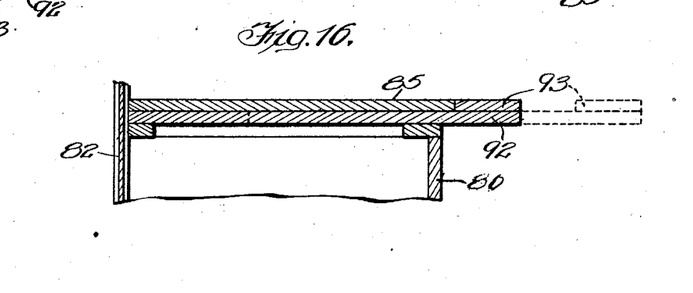
Fig. 16 is a fragmentary view in section taken on line 16—16 of Fig. 15, illustrating a preferred construction of sliding panel used in connection with the desk shown in Figs. 14 and 15.

In some cases it is desirable for the typewriting machine to be supported on a level with the flat desk surfaces, particularly when the machine used is of the type which is not ordinarily supported on a separate stand or which, due to the length of travel of its carriage or other structural features, makes it undesirable to support the machine within a space in the desk as shown in Figs. 1 to 13, inclusive. In certain classes of clerical work which do not require the use of a typewriter, such for example, as bookkeeping and general clerical work, it is desirable to have a desk provided with an inclined desk surface and also a flat desk surface. In Figs. 14 to 16 inclusive I have shown a desk which meets the above requirements and which presents certain other advantageous features. For example, it is preferably composed of two separate sections or units, one of which may be termed a desk section and the other a table section. These are separate structures which may be used separately, but are ordinarily arranged with the table section, that is, the structure adapted to support the typewriting machine, within the desk section.

The desk section consists of end panels 81, back panel 82, and a folding top consisting of the hinged leaves 83, 84, these parts being substantially the same in construction as the corresponding parts in the desk shown in Figs. 1 to 10 inclusive. The table section consists of a top 85, drawer cases 86, 87, forward legs 88, and back legs 89, the latter being connected by a rail 90, the legs being arranged, it will be seen, on the inside of the drawer sections, which latter are secured to the legs and to the top of the table. The drawer section 87 has a slide or pull 91 of ordinary construction. The other drawer section 86 is provided with a pull 92 having secured to its outer end a block 93, the upper surface of which is on a level with the top of the table. By this arrangement the pull can be used in connection with the table top to support a cabinet or receptacle suitable for holding ledger leaves or the like.

I claim:

1. In a desk, the combination of back and end panels, a knock-down bracing frame which extends across the desk from end to end and to which said panels are detachably secured, a flat desk top, and an inclined desk top comprising a hinged cover adapted when closed to provide a cover for said flat desk top.

2. In a desk, the combination of back and end panels, a knock-down bracing frame which extends across the desk from end to end and to which said panels are detachably secured, a flat desk top, and an inclined desk top comprising leaves hinged together so as to fold down over said flat top or raised to uncover the same.

3. In a desk, the combination of back and end panels, a frame to which said panels are secured, a flat desk top, an inclined desk top comprising leaves hinged together so as to fold down over said flat top or raised to uncover the same, and means comprising an arm pivoted at one end and free at the other adapted to support said folding cover in open position.

4. In a sanitary desk, the combination of back and end panels providing supporting legs, a rigidifying frame extending across the desk from end to end and secured to said panels, a desk section supported on said frame at one end thereof, and a combined folding cover and inclined desk top comprising leaves hinged together and supported at their ends on said end panels.

5. In a typewriting and bookkeeping desk, the combination of two flat desk tops, spaced apart for a typewriting machine, an end and back structure inclosing said desk tops, and extending above the same, and a bookkeeper's desk top which is hinged to the aforesaid structure so that it may be folded down to cover said flat desk tops and the space between the same, and will be supported so that its upper surface may be used for bookkeeping purposes, or folded back to permit the use of the typewriting machine and said flat desk tops.

6. In a typewriting and bookkeeping desk, the combination of two flat desk tops arranged at different levels spaced apart for a typewriting machine, and an end and back structure inclosing said desk tops, and extending above the same, and a bookkeeper's desk top which is hinged to the aforesaid structure so that it may be folded down to cover said flat desk tops, and the space between the same, and will be supported so that its upper surface may be used for bookkeeping purposes, or folded back to permit the use of the typewriting machine and said flat desk tops.

7. In a typewriting and bookkeeping desk, the combination of two flat desk tops spaced apart for a typewriting machine, an end and back structure inclosing said desk tops and extending above the same, and a bookkeeper's desk top which is hinged to the aforesaid structure and comprises two leaves hinged together so that they may be folded down to cover said flat desk tops and the space between the same, and will be supported so that their upper surfaces may be used for bookkeeping purposes, or folded back to permit the use of the typewriting machine and the said flat desk tops.

8. In a typewriting and bookkeeping desk, the combination of two flat desk tops spaced apart for a typewriting machine, an end and back structure inclosing said desk tops and extending above the same, and a bookkeeper's desk top which is hinged to the aforesaid structure and comprises two leaves hinged together so that they may be folded down to cover said flat desk tops and the space between the same, and will be supported so that their upper surfaces may be used for bookkeeping purposes, or folded back to permit the use of the typewriting machine and the said flat desk tops, and a pivoted supporting device for holding said bookkeeper's desk top in a folded back position.

9. In a typewriting and bookkeeping desk, the combination of structures comprising a back panel and end panels, a pair of flat desk tops within said structure and spaced apart for a typewriting machine, and a bookkeeper's desk top hinged to said structure so as to be folded down upon the end panels to cover said flat desk tops whereby its upper surface may be used for bookkeeping purposes, or folded back to uncover the flat desk tops.

10. In a typewriting and bookkeeping desk, the combination of structures comprising a back panel and end panels, a pair of flat desk tops within said structure arranged at different levels and spaced apart for a typewriting machine, and a bookkeeper's desk top hinged to the said structure so as to be folded down upon the end panels to cover said flat desk tops, whereby its upper surface may be used for bookkeeping purposes, or folded back to uncover the flat desk tops.

11. In a typewriting and bookkeeping desk, the combination of a structure comprising a back panel and end panels, a pair of flat desk tops within said structure and spaced apart for a typewriting machine, and a bookkeeper's desk top comprising a fixed top member and two hinged panels hinged to said top member so as to be folded down upon said end panels to cover said flat desk tops, whereby their upper surfaces may be used for bookkeeping purposes, or folded back to uncover the flat desk tops.

12. In a typewriting and bookkeeping desk, the combination of a back panel and end panels, a horizontally disposed bracing structure arranged in the space inclosed by said back and end panels, a flat desk top supported on said bracing structure, and a bookkeeper's desk top having a hinged relation with the back panel and adapted to be folded down upon the end panels to cover said flat desk top so that its upper surface may be used for bookkeeping purposes, or folded back to uncover the flat desk top.

13. In a typewriting and bookkeeping desk, the combination of a back panel and end panels, a horizontally disposed bracing structure arranged in the space inclosed by said back and end panels, a pair of flat desk tops spaced apart for a typewriting machine, and supported on said bracing structure, and a bookkeeper's desk top having hinged relation with the back panel and adapted to be folded down upon the end panels to cover said flat desk tops, so that its upper surface may be used for bookkeeping purposes.

14. In a typewriting and bookkeeping desk, the combination of a back panel and end panels, the upper edges of which incline downwardly from the back panel, a horizontally disposed bracing structure arranged in the space inclosed by said back and end panels, a pair of flat desk tops supported on said bracing structure and spaced apart to provide room for a typewriting machine between them, a bookkeeper's desk top having upstanding edges along the back and ends of the desk and comprising a fixed top member, and a pair of folding leaves hinged thereto so as to be folded down to rest on the inclined edges of said panels or raised to uncover said typewriting machine and flat desk tops, and means for supporting said folding leaves in their raised position.

15. A desk of the character described comprising a back panel, a rigid top member and rigid end panels providing an inclosure for a typewriting machine and a flat desk top, and a folding cover hinged to said rigid top member and adapted to be extended over said typewriting machine to provide a bookkeeper's desk top or folded up to uncover the same; said desk structure being provided with upstanding members at the back and along the sides of said rigid top member and folding cover.

16. In a typewriting and bookkeeping desk, the combination of a structure comprising a back panel and end panels rigid with the back panel and extending to the front of the desk; a desk top within and at one side of the space inclosed by said structure and below the upper edges of the same, and a bookkeeper's desk top comprising a section rigid with the back and end panels and a pair of leaves hinged together and one to said rigid section and adapted to be supported when extended by said end panels.

17. In a typewriting and bookkeeping desk the combination of a structure comprising a back panel and end panels which extend to the front of the desk rigid with the back panel, a desk top within said structure, at one side thereof, leaving a space for a typewriting machine, and below the upper edges of said structure, and a bookkeeper's desk top hinged to said structure so that it may be folded down and supported by said end panels to cover said first mentioned desk top and foldable back to uncover the same.

18. In a typewriting and bookkeeping desk, the combination of a structure comprising a back panel and end panels which extend to the front of the desk rigid with the back panel, a desk top within said structure and at one side thereof and below the upper edges of the same, the inner edge of which is recessed so that the back portion of the same is narrower than the front portion, and a bookkeeper's desk hinged to said structure so that it may be folded down and supported by said end panels to cover said first mentioned desk top or to be folded back to uncover the same.

19. In a typewriting and bookkeeping desk, the combination of a structure comprising a back panel and end panels which extend to the front of the desk rigid with the back panel, a drawer section within and at one side of said structure having a desk top below the upper edges of said structure, and a bookkeeper's desk top hinged to said structure so that it may be folded down and supported by said end panels to cover said first mentioned desk top and foldable back to uncover the same.

20. In a typewriting and bookkeeper's desk, the combination of a structure comprising a back panel and end panels which extend to the front of the desk rigid with the back panel, a drawer section within and at one side of said structure having a desk top below the upper edges of said structure, the front portion of which extends inwardly beyond the drawer section and is wider than the back portion thereof, and a bookkeeper's desk top hinged to said structure so that it may be folded down and supported by said end panels to cover said first mentioned desk top and foldable back to uncover the same.

ALEXANDER S. FALLS.